United States Patent [19] [11] 4,327,983
Geutebrück et al. [45] May 4, 1982

[54] MOTOR-DRIVEN CAMERA WITH STEPPING IMAGE-RECORDATION CONTROL

[75] Inventors: Thomas Geutebrück, Bad Honnef; Dieter Dörrer, Unkel, both of Fed. Rep. of Germany

[73] Assignee: Geutebrück Gerätebau GmbH, Honnef, Fed. Rep. of Germany

[21] Appl. No.: 266,349

[22] Filed: May 22, 1981

[30] Foreign Application Priority Data

May 30, 1980 [DE] Fed. Rep. of Germany ....... 3020643

[51] Int. Cl.³ .......................... G03B 1/32; G03B 17/46
[52] U.S. Cl. .................................... 354/171; 352/121; 352/166; 354/173
[58] Field of Search ................................ 354/170-173; 352/84, 121, 166, 185, 188, 190

[56] References Cited

U.S. PATENT DOCUMENTS 4,222,648  9/1980  Beaver ................................ 354/171

FOREIGN PATENT DOCUMENTS 2832539 11/1979 Fed. Rep. of Germany ...... 354/173
1117913  3/1956 France ................................. 352/166

*Primary Examiner*—John Gonzales
*Attorney, Agent, or Firm*—Michael J. Striker

[57] ABSTRACT

A motor-driven camera with stepping image-recordation control includes a shutter which extends between an objective and an exposure opening of the camera, and a friction segment member which engages the film accommodated in a camera to advance the same in predetermined increments from a payout core to a takeup core in a path leading past the exposure opening. The shutter and the friction segment member are mounted on respective shafts which are normal to one another and also to the output shaft of the electric motor which drives the camera. The output shaft has a worm provided thereon, and the shafts of the shutter and of the friction segment member have worm wheels which mesh with the worm. A friction roller engages the film opposite to the friction segment member, and a friction transmission incorporating a friction clutch or coupling is interposed between the friction roller and the capstan for the takeup core to rotate the latter as the film advances. The friction coupling may include a pressure plate component, a housing component adjacent thereto, and a spring accommodated in the interior of the housing component and so engaging the components as to permit slippage therebetween. The friction transmission may include a belt which is trained about the housing component and is received in a circumferential groove provided in the periphery of the housing component.

16 Claims, 7 Drawing Figures

MOTOR-DRIVEN CAMERA WITH STEPPING IMAGE-RECORDATION CONTROL

BACKGROUND OF THE INVENTION

The present invention relates to a motor-driven photographic camera in general, and more particularly to a photographic camera capable of recording a series of individual images at predetermined time intervals in the photosensitive material of consecutive sections of a photographic record carrier strip.

There are already known various constructions of photographic cameras of this type. In one such conventional construction, there is provided a camera body which essentially consists of a front plate equipped with an objective-mounting arrangement, and of a frame or support constructed to accommodate and/or support a common drive operative for simultaneously driving a rotatable shutter which is arranged at the front plate and moves in front of an exposure opening to periodically obscure and expose the same, and an arrangement for transporting a film strip, which is accommodated in a cassette that is arranged rearwardly of the front plate on the support, on an intermittent basis past the exposure opening and behind the same. In this construction, the common drive essentially includes an electric motor with a worm gear for driving the shutter in rotation, and a transmission from the electric motor to a frictional stepping drive for incrementally advancing the film strip past the exposure opening, the frictional stepping drive including a friction segment cylinder driven in rotation and intermittently engaging one of the major surfaces of the film strip and a friction counterroller which is mounted for free rotation across the film strip from the friction segment cylinder and engages the other major surface of the film strip opposite to the region of engagement of the friction segment cylinder with the one major surface of the film strip. Furthermore, this conventionally constructed camera includes an entraining shaft or capstan for the takeup spool or core for the film strip, the entraining shaft being also intermittently driven in rotation in dependence on the friction segment cylinder. Such an arrangement is suited for the automatic taking of a series of photographic pictures.

Cameras of this construction, which are equipped with stepping image-recordation control or, in other words, with a stepping advancement of the film strip for the automatic recordation of a series of individual images in the photosensitive material of consecutive sections of the film strip, can be used in various fields of human endeavor and they are particularly suited to record, in a documentary fashion, the development of a situation or activity in a substantial number of individual photographic images or snapshots which have a very high degree of sharpness and precision considering the circumstances, such as the available light. One of the main areas for use of cameras of this type is in establishments which are freely accessible to and frequented by the public, such as the areas in front of the teller windows in bank or saving institution branch offices, to secure documentary evidence in the event of criminal hold-ups and muggings. Another one of the numerous possible applications of such cameras is in the traffic supervision and/or control on the public roadways of throughfares.

The commercially available photographic cameras which are equipped with the stepping image-recordation control or film advancement mechanisms can be used for these and similar purposes only to a limited extent, if for no other reason, then because of their limited film-storage capacity. For this reason, there have been developed specialized photographic cameras for use in these applications. However, experience with the conventional cameras which have been specially developed for this purpose has shown that they still leave much to be desired in many respects and that they do not satisfy all the requirements to be satisfied by such cameras.

One conventional camera construction which has been specially developed for the above-mentioned applications is known from the German Pat. No. 28 32 539, wherein the shutter disc, which is constructed as a rotary segment disc, is driven in rotation, and the film strip is intermittently or incrementally advanced by a friction stepping mechanism, in dependence on the rotation of the output shaft of an electric motor. However, the measures, which are taken in this conventional arrangement in order to assure exact synchronization of the rotational movement of the shutter disc in front of the exposure opening of the camera with the incremental advancement of the film strip by means of the friction stepping mechanism during the advancing phases of operation which coincide with the phase of operation of the shutter disc in which the latter obscures the exposure opening of the camera, are relatively expensive and require a substantial amount of available space. Thus, in this conventional camera, the electric motor is arranged at the underside of a support part of the camera body, which extends rearwardly from a front plate of the camera body, the driving shaft for the shutter disc also extends along the underside of the support part of the camera body, and only this driving shaft is directly driven by the electric motor by means of a worm gear transmission, while a further gear transmission, this time a bevel gear transmission, is arranged on and at the driving shaft for the shutter disc, and a toothed-belt transmission is provided for driving the stepping friction mechanism for the film advancement, in order to assure that the friction segment cylinder or roller of the stepping friction mechanism is positively driven in rotation in synchronism with the angular displacement of the shutter disc. In addition thereto, the shaft or capstan for the takeup reel or core for the film strip is caused to rotate by another transmission which includes a friction wheel or roller which engages the outer surface of the toothed belt. As advantageous as this known arrangement may be in certain respects, it is also possessed of several important drawbacks. So, for instance, it is very difficult in this known arrangement to adjust the intermittent advancement of the film strip in such a relation to the angular displacement of the shutter disc about its axis of rotation that the advancing phase of the operation of the stepping friction mechanism accurately coincides with the covering phase of operation of the shutter disc during which the shutter disc covers the exposure opening provided in the front plate of the body of the camera, that is, during which the sector-shaped slit of the shutter disc is out of registry with the exposure opening. Another disadvantage of this arrangement is that the friction transmission for driving the entraining shaft or capstan for the takeup reel or core for the film strip, which includes the friction roller engaging the outer surface of the toothed belt, can be accommodated only within relatively narrow limits to the angular velocity of the takeup core which decreases with the increasing diameter of the film material wound around this core; in addition thereto, as the diameter of the body of film material wound around the takeup core increases, the torque required for rotating this core increases as well at a rapid pace which, in certain circumstances, could result in slippage between the friction roller and the outer surface of the toothed belt.

OBJECTS AND SUMMARY OF THE INVENTION

Accordingly, it is a general object of the present invention to avoid the disadvantages of the prior art.

More particularly, it is an object of the invention to provide a motor-driven camera capable of taking a series of pictures at predetermined time intervals, which is not possessed of the disadvantages of the prior-art cameras of this type.

A further object of the present invention is to so construct the camera of the type here under consideration as to make the same very compact and as to simplify the construction of the mechanisms which drive the shutter disc and advance the film strip while simultaneously reducing the amount of space needed for the accommodation of such mechanisms.

It is still another object of the invention to so design the aforementioned driving and advancing mechanisms as to obtain reliable synchronization between the rotation of the shutter disc and the advancement of the film strip under all circumstances.

A concomitant object of the invention is to equip the camera with a drive for rotating the capstan for the film takeup reel in correspondence to the incremental advancement of the film while taking the torque increase with the increasing diameter of the body of film wound around the takeup reel into consideration.

Yet another object of the invention is to develop a camera of the aforementioned type which is simple in construction, easy and inexpensive to manufacture, and reliable in operation nevertheless.

In pursuance of these objects and others which will become apparent hereafter, one feature of the present invention resides in an arrangement for recording a series of images at predetermined time intervals in the photosensitive material of consecutive sections of a photographic record carrier strip supported on payout and takeup cores, which arrangement comprises, briefly stated, a combination including a support extending along a plane and having front and rear portions; means for so supporting the cores on the rear portion for rotation about respective axes normal to the plane that the cores extend in one axial direction from the plane and the strip extends in a predetermined path between the cores; means for so shielding the strip that ambient light is prevented from reaching all but an exposed zone of the strip at least when the cores are supported on the support; an objective; means for so mounting the objective on the front portion as to be spaced in the one direction from the plane and as to direct light onto the exposed zone of the strip; a shutter disc mounted at the front portion for rotation about an axis extending front-to-rear in parallelism with the plane at a spacing in the one direction therefrom, and interposed between the objective and the exposed zone of the strip to periodically cover and expose the exposed zone to the light passing through the objective; means for intermittently advancing the strip in the path to move successive strip increments onto the exposed zone, including a friction segment member mounted at the merger region of the front and rear portions for rotation along the path about an axis parallel to the one direction and having a circumferentially incomplete contact surface which frictionally engages one major surface of the strip during the advancing phase of operation of the friction segment member and disengages the same during a rest phase, and means for rotating the takeup core; a reaction member engaging the other major surface of the strip opposite the friction segment member; and means for so synchronously driving the advancing means and the shutter disc that the latter exposes the exposed zone of the strip during the rest phase of operation of the friction segment member and covers the same during the advancing phase, including an electric motor having an output shaft rotating about an axis extending at right angles to those of the friction segment member and the shutter disc, a worm mounted on the output shaft for rotation therewith, a first worm wheel connected to the shutter disc for joint rotation and meshing with the worm, and a second worm wheel connected to the friction segment member for rotation therewith and also meshing with the worm. Advantageously, the reaction member is constructed as a friction roller mounted at the merger region for rotation about an axis parallel to the one direction.

It is further advantageous when the shutter disc, the friction segment member, the friction roller, and the cores, are mounted on respective rotary shafts, at least when the arrangement is being used, for joint rotation therewith, and when the first and second worm wheels are mounted on the rotary shafts of the shutter disc and of the friction segment member, respectively, for joint rotation therewith. A particularly advantageous construction is obtained when the support includes a main portion having the front and rear portions, and an auxiliary portion extending in the one direction away from the main portion at the front portion of the latter, and when the rotary shafts of the shutter disc and of the friction segment member are mounted on the auxiliary portion of the support. Then, the auxiliary portion of the support is advantageously constructed as an enclosed hollow casing accommodating at least a part of the electric motor, the friction segment member and the rotary shaft thereof, the worm and worm wheels, and at least a part of the rotary shaft of the shutter disc, and when the casing has a rear wall having an opening through which at least that portion of the friction segment member which has the contact surface thereon extends into contact with the one major surface of the strip during the advancing phase. Another advantageous feature resides in the fact that the means for rotating the takeup core includes a friction transmission interposed between the rotary shafts of the friction roller and of the takeup core.

When the arrangement of the present invention is constructed in the above-discussed manner, there is obtained the advantage that, inasmuch as the electric motor, the shutter disc and the friction segment member, as well as the rotary shafts thereof, are arranged in a part of the auxiliary portion which extends in said one direction away from the main portion laterally of the exposure opening provided in the auxiliary portion in registry with the objective and the exposed zone of the strip, each of them being spaced in said one direction from said plane, there is being utilized a space which would otherwise have to be considered as wasted. In addition thereto, as a result of the mutually normal arrangement of the output shaft of the electric motor and of the rotary shafts of the shutter disc and of the friction segment member, it is possible to have the two rotary shafts engage the output shaft generally at the same region of the latter, so that there is obtained, at a minimum technical expenditure, a reliable and unproblematical synchronization of the angular positions of the respective rotary shafts, and thus of the shutter disc and the friction segment member mounted thereon, relative to one another. The engagement of the worm wheels with the worm provided on the output shaft of the electric motor is a particularly simple technical solution.

It is particularly advantageous that, in accordance with a further aspect of the present invention which has already been mentioned above, the rear wall of the casing which constitutes the auxiliary portion of the support and accommodates the friction segment member has to be provided merely with an opening for the passage of a portion of the friction segment therethrough. The opening can be advantageously so dimensioned, and the friction segment member so positioned relative thereto, that, during the rotation of the friction segment member, only that portion of the latter which projects radially outwardly beyond the remainder of the friction segment member over a part of the circumference thereof and thus forms the contact surface which engages the one major surface of the strip and entrains the same for joint travel extends through this opening in the rear wall, this portion being retracted into the interior of the casing during the continuation of the rotation of the friction segment member beyond the point of last contact with the strip. As a result of this, the friction segment member, which is so important for the transportation of the extremely sensitive film material or similar photosensitive strip is protected, in a simple manner, from soiling and from outward damage by being accommodated, in a protected manner, in the interior of the casing.

Additionally, a further advantage is obtained which results from the direct force transmission between the output shaft of the electric motor and the rotary shaft of the friction segment member and the accommodation of the meshing elements in the interior of the casing and which resides in the fact that the friction roller which is arranged at the opposite side of the strip from the friction segment member and is freely rotatable and caused to rotate only as a result of the contact between its peripheral surface and the other major surface of the strip can be given a sufficiently large perimeter to serve as a driving element which is connected by a friction drive or transmission with the rotary shaft or capstan for the takeup reel or core.

The arrangement for intermittently advancing the strip is especially durable when the friction segment member has a layer of hard material of limited resiliency at least on the contact surface thereof and the friction roller has a layer of a relatively much softer material on its periphery which contacts the other major surface of the strip, so that only the layer of the friction roller and not that of the friction segment member is deformed when radial pressure is applied to the layers during the passage of the strip between the friction roller and the contact surface of the friction segment member. This expedient also greatly improves the intermittent advancement of the strip and the transmission of force to the entraining rotary shaft for the takeup core, especially if the layer of the friction roller is of rubber or other materials having similar yieldability and resiliency.

The rotation of the rotary shaft for the takeup core and the correspondence of the speed of rotation of this shaft with the gradually increasing diameter of the body of the strip wound around the takeup core can be further improved when, in accordance with a further concept of the present invention, the friction transmission between the friction roller and the rotary shaft of the takeup core incorporates a friction coupling. As a result of the provision of such friction coupling, no slippage between the driving belt and the pulleys around which the driving belt is trained has to be taken into account when designing the friction transmission. Rather, the slippage which occurs as the diameter of the body of the strip convoluted around the takeup core increases happens only in the friction coupling which can be mounted either on the rotary shaft of the friction roller or on the rotary shaft of the takeup core.

An advantageous and very simple construction of the friction coupling is obtained when the coupling includes a plate-shaped pressure component rigid with the respective shaft on which the coupling is mounted, a cup-shaped housing component mounted on the respective rotary shaft with freedom of rotation relative thereto and having an open end facing the pressure component, and a resilient entraining member situated in the housing component and so connected to the components as to permit slippage between itself and at least one of the components, and when the friction transmission further includes an endless transmission element, particularly a belt, which is trained around the housing component and the other of the rotary shafts for the takeup core and of the friction roller, or around the friction roller itself when the coupling is mounted on the rotary shaft for the takeup core. The entraining member can be constituted by a cross-sectionally arcuate, or cross-sectionally undulating, spring. The housing component may be provided with a circumferentially extending groove at its outer periphery for receiving the transmission element or belt.

The arrangement of the present invention may be further equipped with devices which control the operation of the electric motor. One such device includes a cam mounted on the rotary shaft of the payout core for joint rotation, and electrical switch which is mounted on the support adjacent to the trajectory of movement of the cam and having a cam follower which traces the cam and causes the switch to generate electrical signals indicative of the rotation of the payout core. Then, these electrical signals can be converted into visually perceptible or audible signals which are indicative of the advancement of the strip, and/or for automatically shutting-off the electric motor once the strip has been payed out from the payout core. Another such device may include a cam mounted on the rotary shaft of one of the shutter and the friction segment member for joint rotation therewith, and an electrical switch mounted on the support adjacent to the trajectory of movement of the cam and having a cam follower in contact with the cam and causing the switch to generate electrical signals indicative of the rotation of the one rotary shaft. Then, the electrical signals may be counted and used for displaying the result as an indication of the number of revolutions of the respective rotary shaft and/or for shutting-off the electric motor when the strip has been payed out from the payout core such that the electric motor is shut off in a position in which the friction segment member is in the rest phase of operation thereof and the shutter covers the exposed zone of the strip.

A particularly simple way of mounting the electric motor at the front portion of the support and at a spacing in the one direction therefrom is obtained when the front surface of the auxiliary portion of the support is formed with a receiving recess for the electric motor, this receiving recess opening onto the front surface, and when the mounting means for the objective includes a front plate separate from the support and supported on the front portion of the latter frontwardly of the auxiliary portion in its position of use, the front plate having a rear surface which is formed with another recess which opens onto the rear surface of the front plate and complements the receiving recess in the front surface of the auxiliary portion of the support to partially receive the electric motor when the front plate is in its position of use. A particularly simple way of preventing the housing or stator of the electric motor from turning about the output shaft or rotor thereof is obtained when the front plate is formed with a resilient portion which partially bounds the recess in the rear surface of the front plate for partially accommodating the housing of the electric motor, the resilient portion being advantageously partly separated from the remainder of the front plate to resiliently clamp the housing or stator of the electric motor between itself and the surface bounding the receiving recess for the housing or stator of the electric motor which is provided in the front surface of the auxiliary portion of the support, provided that the front plate is in its position of use.

The novel features which are considered as characteristic of the invention are set forth in particular in the appended claims. The improved camera or similar picture-taking arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
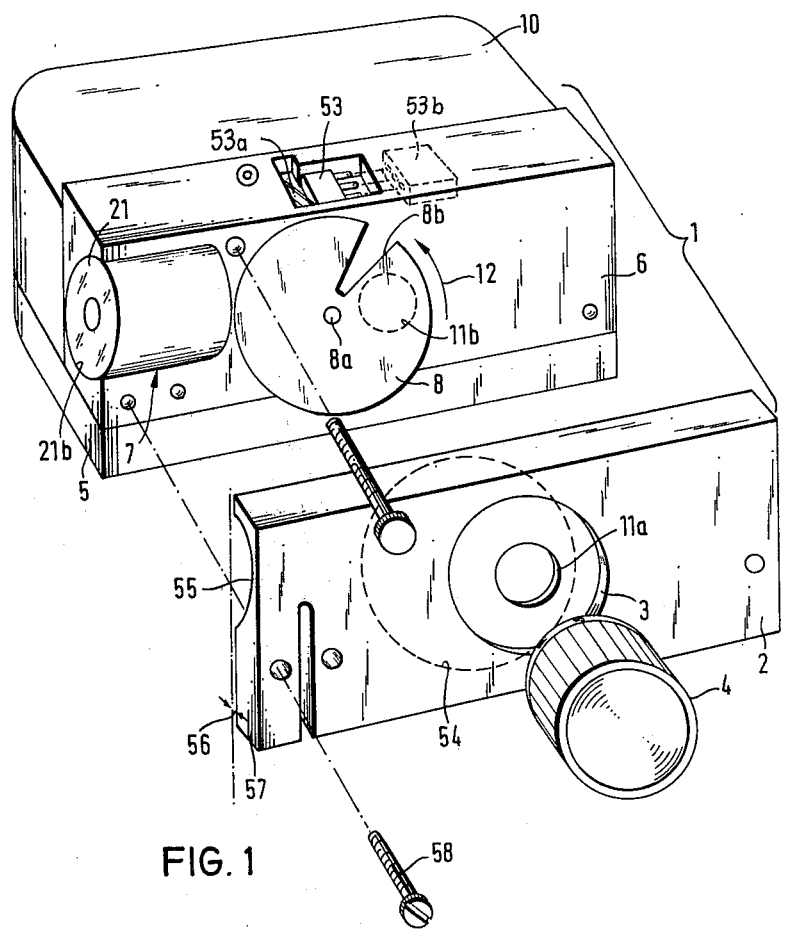
FIG. 1 is a perspective, partially exploded view of a photographic camera embodying the present invention as seen from the front thereof.
Figure 5:
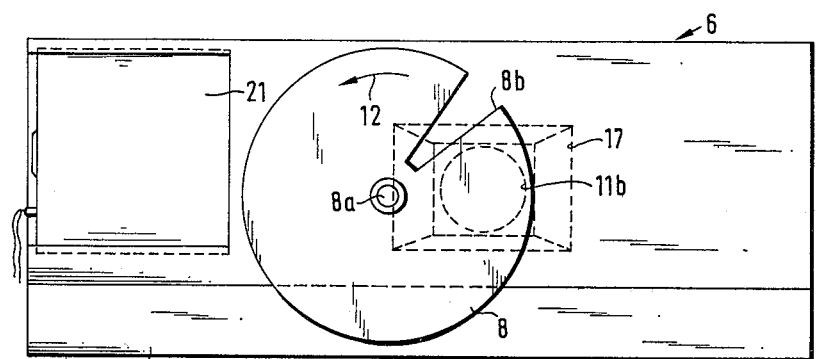
FIG. 5 is a somewhat diagrammatic front elevational view of the camera body as seen in the direction of the arrow V in FIG. 4.
Figure 6:
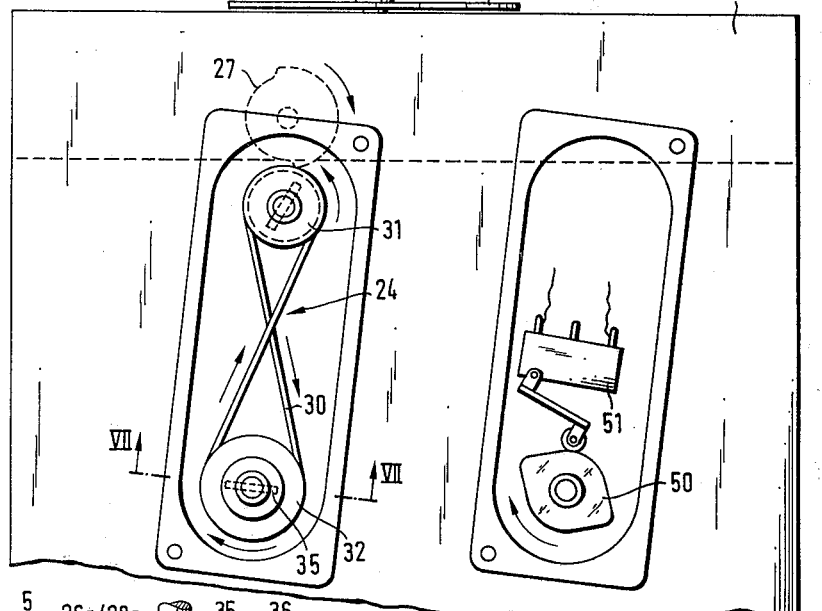
FIG. 6 is a partially sectioned bottom plan view of the camera body as seen in the direction of the arrow VI in FIG. 5.

Referring now to the drawing in detail, and first to FIG. 1 thereof, it may be seen therein that the arrangement or motor-driven camera of the present invention includes a camera body 1 which essentially consists of a front plate 2 equipped with a holder 3 for an objective 4, and of a support which consists of a main portion 5 and a front wall or auxiliary portion 6 which extends upwardly from the main portion 5 at the front end thereof, as seen in FIG. 1, and which is equipped for supporting shared driving means for a rotating shutter disc 8 and for an arrangement for advancing a strip 9 (see FIG. 2) of photosensitive material, such as a photographic film which is confined in a cassette 10 that is supported on the main portion 5 of the support rearwardly of the auxiliary portion 6 thereof. The shutter disc 8 is constructed as a sector shutter having a wedge-shaped exposure slit 8b, and is mounted for joint rotation on a shaft 8a intermediate two registering exposure openings 11a and 11b provided in the front plate 2 and in the auxiliary portion 6, respectively, in the direction of an arrow 12 which is shown in FIGS. 1 and 5.

Figure 2:
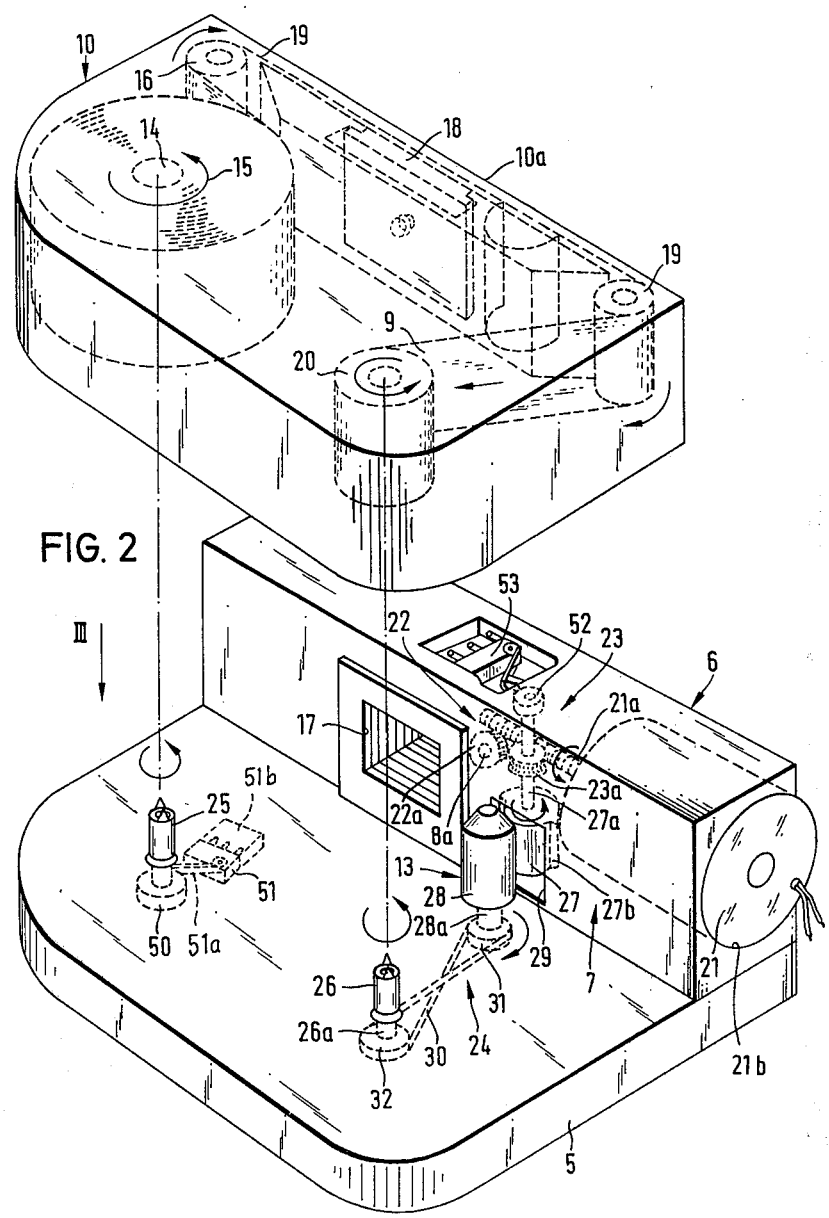
FIG. 2 is a perspective view of the camera of FIG. 1 as seen from the rear thereof and with a film cassette lifted above the same.
Figure 4:
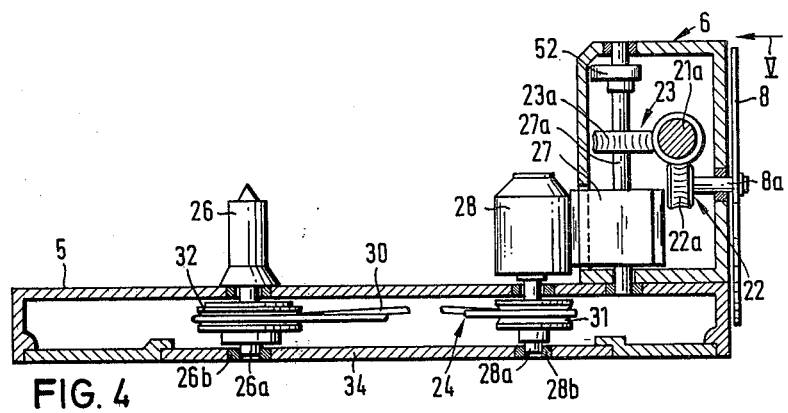
FIG. 4 is a sectional view of the camera body taken on line IV—IV of FIG. 3.
Figure 3:
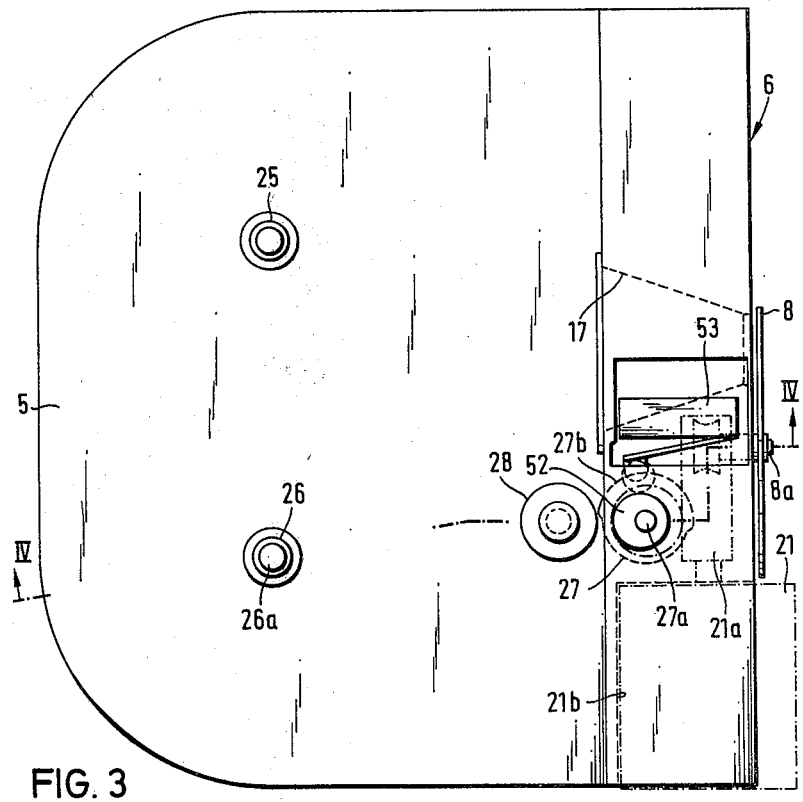
FIG. 3 is a top plan view of the body of the camera of FIGS. 1 and 2 as seen in the direction of the arrow III in FIG. 2.

The photosensitive strip 9 which is accommodated in the cassette 10 is advanced by an intermittent frictionally engaging stepping mechanism 13, which is accommodated in the camera body 1, from a payout reel or core 14 in the direction of an arrow 15 seen in FIG. 2, in a predetermined path around a deflecting roller 16 between an exposure window provided at the rear surface or wall of the auxiliary portion 6, which window is indicated at 17 and a spring-loaded pressing plate 18 provided at a front region 10a of the cassette 10, then around another deflecting roller 19 arranged at the opposite side of the cassette 10, and finally to a takeup reel or core 20. As will be discussed in more detail later, the takeup core 20 is rotated during the time intervals in which the shutter disc 8 covers the exposure opening 11b, while the friction stepping mechanism 13 advances the strip 9 by an increment having a length corresponding to that of a section of the strip 9 containing a single frame or picture.

As may be ascertained more easily from the comparison of FIGS. 2 to 7, the driving mechanisms of the camera, which are indicated in general by the reference numeral 7, essentially consist of an electric motor 21, a first worm gear transmission 22 for rotating the shutter disc 8, a second worm gear transmission 23 for driving the friction stepping mechanism 13 for the advancement of the strip 9, and a friction transmission 24, which derives its motion from the operation of the mechanism 13 and which is operative for rotating the takeup core 20 accommodated in the cassette 10. As may be seen in FIG. 2, the cassette 10 is so positioned on the main portion 5 of the support that a shaft 25 extends into the cassette 10 and into the payout core 14, while an identically configurated shaft 26 extends into the cassette 10 and into the takeup core 20.

The electric motor 21 is introduced from the side into a conformingly configurated receiving recess 21b provided in the auxiliary portion 6 of the support, in a direction parallel to the front region 10a of the cassette 10. The electric motor 21 has an output shaft 21a having an end portion shaped as a worm, while the first and second worm gear transmissions 22 and 23 have respective worm wheels 22a and 23a which mesh with the worm of the output shaft 21a axially and with an angular offset of 90° about the axis of the output shaft 21a of the electric motor 21.

The friction stepping mchanism 13 consists of a friction segment member or roller 27 which intermittently, once every revolution thereof about and with its rotary shaft 27a, engages the strip 9 at one of the major surfaces thereof, and of a friction or reaction roller 28 which is arranged across the strip 9 from the friction segment member 27 and engages the other major surface of the latter to serve as a back-pressure member for the friction segment member 27, the friction roller 28 being freely rotatable about its axis.

The shafts 21a, 8a, and 27a of the electromotor 21, of the shutter disc 8, and of the friction segment member 27, respectively, are all mounted in the part of the auxiliary portion 6 of the support which extends upwardly from the main portion 5 laterally of the two exposure openings 11a and 11b and of the exposure window 17, the shafts 21, 8a, and 27a being situated in their entirety upwardly of the main portion 5 of the support. Only the rear wall of the auxiliary portion 6, which faces the strip 9, is provided with a rectangular access opening 29 for the friction segment member 27, which is exactly fitted to the dimensions of a radially outwardly projecting segment portion 27b of the friction segment member 27, so that the entire driving unit is accommodated in the interior of the auxiliary portion 6 of the support not only in a space-saving manner, but also in such a manner as to be protected from soiling and damage.

The friction roller 28 which serves as a back-pressure roller for the friction segment member 27 and which contacts the strip 9 at its back surface extends upwardly from the main portion 5 in axial parallelism with the friction segment member 27. The friction roller 28 is connected by the friction transmission 24 with the rotary shaft of capstan 26 for the takeup core 20, which also projects upwardly from the main portion 5 of the support in axial parallelism with the friction roller 28. As mentioned above, the takeup core 20 is accommodated within the cassette 10 and is slid onto the shaft or capstan 26 as the cassette 10 is placed onto the camera body 1 to be supported by the main portion 5 of the support.

In order to assure that the outwardly projecting segment portion 27b of the friction segment member 27 does not become deformed by the pressure applied by the friction roller 28 to its contact surface, and thus that the circumferential dimension or radius of this contact surface do not change, the friction segment member 27 is provided with a hard layer or coat of a material of only limited, if any, flexibility at least at the contact surface of the segment portion 27b thereof, while the friction roller 28 is provided at its periphery which contacts the strip 9 with a relatively much softer layer of rubber or another material having similar yieldability and resiliency. By resorting to these expedients, it is assured, in a very simple manner, that only the layer on the periphery of the friction roller 28, but not the considerably firmer material of the layer on the contact surface of the friction segment member 27, is deformed when radial pressure is applied to these layers during the passage of the strip 9 between the periphery of the friction roller 28 and the contact surface of the friction segment member 27. This, in turn, results in a situation where the contact surface of the friction segment member 27, which is provided on the outwardly projecting segment portion 27b, always contacts the strip 9 over the same circumferential length and at the same radius and, therefore, always advances the strip 9 by the same incremental distance during each revolution of the friction segment member 27 about its axis.

As can further be ascertained from FIGS. 2, 4, 6 and 7 of the drawing, the friction transmission 24 from the friction roller 28 to the entraining shaft or capstan 26 for the takeup core 20 essentially consists of a driving belt 30 which is trained about two pulleys 31 and 32 which are respectively arranged in the main portion 5 of the support below the friction roller 28 and below the capstan 26 for the takeup core 20. One of the pulleys 31 and 32 is additionally provided with a friction or slip coupling 33 which is illustrated in detail in FIG. 7. The pulley 31 or 32 which is provided with the friction coupling 33 can be arranged either at the lower end 26a of the capstan or entraining shaft 26, or on the rotary shaft 28a of the friction roller 28, within the confines of the main portion 5 of the support, and it can be secured by a cover or lid 34, seen in FIGS. 4 and 7, which simultaneously contains the bearings 26b or 28b for either the lower end 26a of the capstan 26 or the lower end of the shaft 28a of the friction roller 28.

Figure 7:
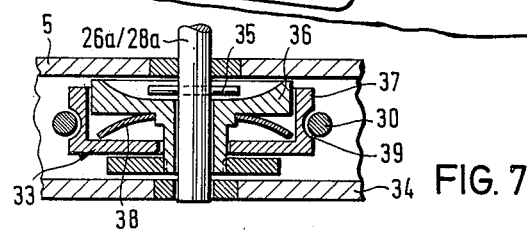
FIG. 7 is a partial cross-sectional view of the camera body taken along the line VII—VII of FIG. 6.

As seen in detail in FIG. 7, the friction coupling 33 consists of a pressure plate 36 which is connected to the respective shaft 26a or 28a by means of a radial entraining pin 35 for joint rotation therewith, and of a housing component 37 which coaxially adjoins the pressure plate component 36 of the coupling 33, as well as of a cross-sectionally arcuate or undulating spring element 36 which urges the housing component 37 in direction away from the underside of the pressure plate component 36. The housing component 37 has a circumferentially extending groove 39 at its outer periphery, in which the driving belt 30 of the friction transmission 24 is received.

Similarly to the friction coupling 33, even the other pulley 31 or 32 which is mounted on the other shaft 26a, 28a can be provided at its upwardly facing end surface with a radial slot for receiving the entraining pin 35 connected to the respective other shaft 26a or 28a, and may be secured by the abutment against the inner side of the respective closing lid 34 mounted on the respective shaft 26a or 28a to the latter and held in engagement with the entraining pin 35.

For controlling the operation of the arrangement 7, the camera is equipped with a cam 50 which is mounted for joint rotation on the lower end of the shaft or capstan 25 for the payout core 14 of the cassette 10, which shaft 25 is mounted on the main portion 5 of the support for rotation in axial parallelism with the shaft 26 for the takeup core 20. A microswitch 51 has a cam follower 51a which traces the cam 50 as the shaft 25 rotates so that the switch 50 issues electrical signals at intervals as the camera operates. The electrical signals are forwarded to a control arrangement 51b which is of a conventional construction and hence has been shown only in phantom lines, which arrangement 51b issues visually perceptible or audible signals indicative of the withdrawal of the strip 5 from the payout core 14 during the operation of the camera, and automatically shuts off the camera when the end of the strip 9 has been reached.

In addition thereto, a cam 52 is mounted for joint rotation on the rotary shaft 27a of the friction segment member 27 or on the rotary shaft 8a of the shutter disc 8. A further microswitch 53 is provided, which has a cam follower 53a tracing the cam 52 so that the switch 53 issues electrical signals at regular intervals during the operation of the camera. These electrical signals are supplied to another control arrangement 53b, which may be separate from or combined with the control arrangement 51b and which is also of a conventional construction so that it has been shown merely in phantom lines as well. The arrangement 53b includes a counter and/or display for indicating the number of images already recorded, and it is equipped for terminating the supply of electric power to the electric motor 21 at such a moment that the output shaft stops in a position at the end of the operation of the camera in which the friction segment member 27 is out of engagement with the strip 9 and the exposure opening 11a, 11b is obstructed by the shutter disc 8. As a result of this, there is assured a simple exchange of the cassette 10 and, in addition thereto, undesired impingement of light on the exposed or unexposed zone of the strip 9 is avoided prior to as well as subsequent to the exchange of the cassette 10.

Furthermore, the mounting and adjustment of the position of the electric motor 21 on the auxiliary portion or front wall 6 of the camera body 1 is considerably simplified when the holder 3 for the objective 4 is not mounted directly on the front wall 6, but when it is mounted on the front plate 2 which is situated frontwardly of the front wall 6 proper. Then, the receiving recess 21b in the front wall 6 for the electric motor 21 can be made circumferentially incomplete, and the front plate 2 can be provided, at its rear surface which faces the front surface of the front wall 6, with a complementary recess 55 or a plurality of such recesses, the shape of which substantially corresponds to that of the portion of the housing or stator of the electric motor 21 which is to be received in the recess or recesses 55. Then, a resilient clamping portion or lug may be provided, as indicated at 57, this lug 57 being arranged at a distance 56 from the front surface of the front wall 6 and extending downwardly, being separated from the remainder of the front plate 2 by a slot and partially bounding the recess 55. Then, a screw 58 or a similar element can be used to press the lug 57 toward the front surface of the front wall 6, thus diminishing the size of the gap 56 and clamping the housing or stator of the electric motor 21 between itself and the surface bounding the receiving recess 21b in the front wall 6. Thus, no additional fasteners are needed for holding the electric motor 21 in position against displacement in the axial direction thereof or against turning about the axis of the output shaft 21a.

It will be understood that each of the elements described above, or two or more together, may also find a useful application in other types of arrangements differing from the type described above.

While the invention has been illustrated and described as embodied in a motor-driven camera for taking a series of pictures at predetermined time intervals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. An arrangement for recording a series of images at predetermined time intervals in the photosensitive material of consecutive sections of a photographic record carrier strip supported on payout and takeup cores, comprising, in combination, a support extending along a plane and having front and rear portions; means for so supporting the cores on said rear portion for rotation about respective axes normal to said plane that the cores extend in one axial direction from said plane and the strip extends in a predetermined path between the cores; means for so shielding the strip that ambient light is prevented from reaching all but an exposed zone thereof at least while the cores are supported on said support; an objective; means for so mounting said objective on said front portion as to be spaced in said one direction from said plane and as to direct light onto the exposed zone of the strip; a shutter mounted at said front portion for rotation about an axis extending front-to-rear in parallelism with said plane at a spacing in said one direction therefrom; and interposed between said objective and the exposed zone to periodically cover the expose the latter to the light passing through said objective; means for intermittently advancing the strip in said path to move successive increments thereof onto the exposed zone, including a fiction segment member mounted at the merger region of the front and rear portions for rotation along said path about an axis parallel to said one direction and having a circumferentially incomplete contact surface which frictionally engages one major surface of the strip during the advancing phase of operation of said friction segment member and disengages the same during a rest phase, and means for rotating said takeup core; a reaction member engaging the other major surface of the strip opposite the friction segment member; and means for so synchronously driving said advancing means and said shutter that the latter exposes the exposed zone of the strip during the rest phase of operation of said friction segment member and covers the same during said advancing phase, including an electric motor having an output shaft rotating about an axis extending at right angles to those of said friction segment member and said shutter, a worm mounted on said output shaft for rotation therewith, a first worm wheel connected to said shutter for joint rotation and meshing with said worm, and a second worm wheel connected to said friction segment member for joint rotation and also meshing with said worm.

2. An arrangement as defined in claim 1, wherein said reaction member is a friction roller mounted at said merger region for rotation about an axis parallel to said one direction.

3. An arrangement as defined in claim 2, and further comprising respective rotary shafts for said shutter, said friction segment member, said friction roller, and the cores, said first and second worm wheels being mounted on said rotary shafts of said shutter and of said friction segment member, respectively, for joint rotation therewith.

4. An arrangement as defined in claim 3, wherein said support includes a main portion having said front and rear portions, and an auxiliary portion extending in said one direction away from said main portion at said front portion thereof; and wherein said electric motor, and said rotary shafts of said shutter and of said friction segment member are mounted on said auxiliary portion of said support.

5. An arrangement as defined in claim 4, wherein said auxiliary portion of said support is an enclosed casing accommodating at least a part of the electric motor, said friction segment member and said shaft thereof, said worm and worm wheels, and at least a part of said rotary shaft of said shutter; and wherein said casing has a rear wall having an opening through which at least that portion of said friction segment member which has said contact surface extends into contact with said one major surface of the strip during said advancing phase.

6. An arrangement as defined in claim 3, wherein said means for rotating said takeup core includes a friction transmission interposed between said rotary shafts of said friction roller and of the takeup core.

7. An arrangement as defined in claim 6, wherein said friction transmission includes a friction coupling.

8. An arrangement as defined in claim 7, wherein said friction coupling is arranged on one of said rotary shafts of said friction roller and of the takeup core and includes a plate-shaped pressure component rigid with said one rotary shaft, a cup-shaped housing component mounted on said one shaft with freedom of relative rotation and having an open end facing said pressure component, and a resilient entraining member situated in said housing component and so connected to said components as to permit slippage between itself and at least one of said components; and wherein said friction transmission further includes an endless transmission element trained around said housing and the other of said rotary shafts of the takeup core and of said friction roller.

9. An arrangement as defined in claim 8, wherein said entraining member is a cross-sectionally arcuate spring.

10. An arrangement as defined in claim 8, wherein said entraining member is a cross-sectionally undulating spring.

11. An arrangement as defined in claim 8, wherein said housing component has an outer periphery having a circumferentially extending groove for receiving said transmission element.

12. An arrangement as defined in claim 3, and further comprising means for generating signals indicative of the rotation of the payout core, including a cam mounted on said rotary shaft of the payout core for joint rotation, and an electrical switch mounted on said support adjacent to the trajectory of movement of said cam and having a cam follower in contact with the latter; and means for issuing perceptible signals based on said electrical signals and indicative of the advancement of the strip, and for automatically shutting-off said electric motor when the strip has been payed out from said payout core.

13. An arrangement as defined in claim 3; and further comprising means for generating electric signals indicative of the rotation of one of said rotary shafts of said shutter and of said friction segment member, including a cam mounted on said one rotary shaft for joint rotation, and an electrical switch mounted on said support adjacent to the trajectory of movement of said cam and having a cam follower in contact with the latter; and means for counting said electrical signals and displaying the result as an indication of the number of revolutions of said one rotary shaft and thus of the images recorded on the strip, and for using the result for shutting-off said electric motor when the strip has been payed out from the payout core for shutting-off said electric motor in a position in which said friction segment member is in said rest phase and said shutter covers said exposed zone of the strip.

14. An arrangement as defined in claim 3, wherein said friction segment member has a layer of hard material of limited resiliency at least on said contact surface thereof and said friction roller has a layer of a relatively much softer material on its periphery which contacts said other major surface of the strip, so that only said layer of said friction roller and not that of said friction segment member is deformed when radial pressure is applied to said layer during the passage of the strip between said friction roller and said contact surface of said friction segment member.

15. An arrangement as defined in claim 1, wherein said support includes a main portion having said front and rear portions, and an auxiliary portion extending in said one direction away from said main portion at said front portion thereof and having a front surface formed with a receiving recess for the electric motor which opens onto said front surface; wherein said mounting means for said objective includes a front plate separate from said support and supported on said front portion of the latter frontwardly of said auxiliary portion in its position of use, said front plate having a rear surface formed with another recess which opens onto said rear surface and is complementary to said recess in said auxiliary portion of said support to partially receive said electric motor therein when in said position of use.

16. An arrangement as defined in claim 15, wherein said front plate includes a resilient portion which partially bounds said other recess and is partly separated from the remainder of said front plate to resiliently clamp said electric motor between itself and the surface bounding said recess in said auxiliary portion of said support in said position of use.

* * * * *